(No Model.)
J. LINDSTROM.
SELF ACTING WATER KEY FOR WIND INSTRUMENTS.
No. 504,354. Patented Sept. 5, 1893.
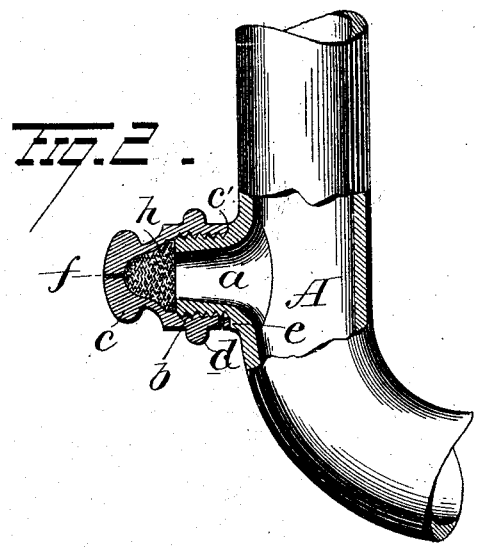
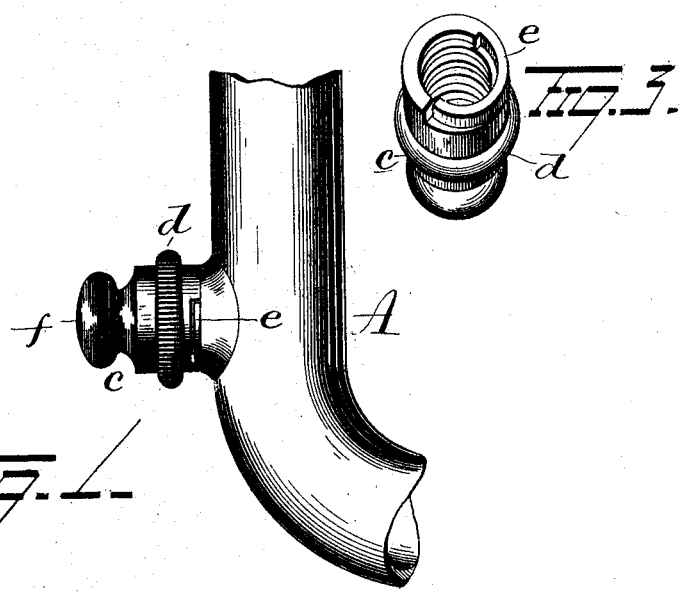
Witnesses
R. Nottingham
G. F. Downing
Inventor
John Lindstrom
By K. A. Seymour
Attorney

UNITED STATES PATENT OFFICE.

JOHN LINDSTROM, OF HENDERSON, KENTUCKY.

SELF-ACTING WATER-KEY FOR WIND-INSTRUMENTS.

SPECIFICATION forming part of Letters Patent No. 504,354, dated September 5, 1893.

Application filed May 20, 1893. Serial No. 474,952. (No model.)

*To all whom it may concern:*

Be it known that I, JOHN LINDSTROM, a resident of Henderson, in the county of Henderson and State of Kentucky, have invented certain new and useful Improvements in Self-Acting Water-Keys for Wind-Instruments; and I do hereby declare the following to be a full, clear, and exact description of the invention, such as will enable others skilled in the art to which it appertains to make and use the same.

My invention relates to improvements in self acting water keys for wind instruments, and more particularly to devices for removing water from the same,—the object of the invention being to provide simple and efficient means whereby to remove water from wind instruments without the necessity of taking the same apart and without the use of water keys.

A further object is to so construct a device for removing water from a wind instrument that its operation shall be automatic and continuous during the time in which the instrument is in use.

A further object is to provide means whereby to automatically remove water from a wind instrument without causing the instrument to leak when in use.

With these objects in view the invention consists in certain novel features of construction and combinations and arrangements of parts as hereinafter set forth and pointed out in the claims.

In the accompanying drawings: Figure 1 is an enlarged view of a portion of a wind instrument, showing my improvement applied thereto. Fig. 2 is a sectional view of my improvement. Fig. 3 is a detached view of the cap.

At the point or points on the instrument where the water is liable to accumulate and where water keys are usually located, I place a perforated boss $a$ adapted to communicate with the interior of the instrument and provided on its exterior with screwthreads $b$, for the reception of an internally screwthreaded cap $c$, said cap preferably having a milled flange $d$, whereby to manipulate it.

Between the cap $c$ and a shoulder $c'$ on the boss $a$, a spring $e$ is located, whereby to prevent the cap from working off when the instrument is in use. In the head of the cap a perforation $f$ is made, said perforation being preferably about one-fiftieth of an inch in diameter and one-sixteenth of an inch long.

A small piece of absorbent material, such as sponge, felt, cotton or other suitable material, is located within the cap $c$ and normally covers the perforation $f$ and closes the end of the opening in the boss $a$. From this construction and arrangement of parts it will be seen that as the water which accumulates in the instrument reaches the perforated boss $a$, it will enter the cap $c$ and be absorbed by the absorbent material $h$, and by it be conducted by capillary attraction to the perforation $f$ in the cap. The perforation $f$ being very small, the water will not immediately fall off of the cap after passing through it, but will remain at the outer end of the perforation until quite a large drop accumulates, when it will drop off, but when the drop falls off, another drop of water will be forming behind it, so that it will be seen the perforation $f$ will, it all times, during the operation be closed by the water, and thus produce a water seal and prevent the instrument from leaking,—that is to say, prevent air from escaping through the perforation $f$ when the instrument is in use.

With water keys as heretofore constructed, the water would pass the key and become lodged in other parts of the instrument. With my device the water cannot pass, but will be caught, absorbed by the absorbent material and be conducted out of the instrument as it collects.

Heretofore it has been necessary to take the instrument apart and shake the water therefrom, but with my improvement this is unnecessary,—in fact the slides usually employed may be dispensed with entirely, as my improved device will remove the water automatically as it collects.

The absorbent material $h$, not only performs the function of a capillary conductor, but also serves as a strainer and prevents any particles which might find their way into the instrument from entering the small perforation $f$.

My improvements are very simple in construction, neat and ornamental in appearance and are effectual, in every respect, in the performance of their functions.

Slight changes might be made in the details of construction of my invention without departing from the spirit thereof or limiting its scope and hence I do not wish to restrict myself to the precise details of construction herein set forth, but, Having fully described my invention, what I claim as new, and desire to secure by Letters Patent, is—

1. The combination with a wind instrument, of a cap adapted to communicate therewith, and provided with a perforation, and absorbent material in said cap, substantially as set forth.

2. The combination with a wind instrument, of a cap adapted to communicate therewith and provided in its head with a small perforation and absorbent material in said cap in line with said perforation, substantially as set forth.

3. The combination with a wind instrument, of a cap adapted to communicate therewith and provided with a perforation in its head, absorbent material in said cap, and a spring between said cap and the instrument, substantially as set forth.

4. The combination with a wind instrument, of a perforated boss communicating therewith, a cap on said perforated boss and provided with a perforation in its head, and absorbent material in said cap behind said perforation, substantially as set forth.

In testimony whereof I have signed this specification in the presence of two subscribing witnesses.

JOHN LINDSTROM.

Witnesses:
WM. H. WITT,
ED. HOPKINS.